(12) United States Patent
Singh

(10) Patent No.: US 6,359,615 B1
(45) Date of Patent: Mar. 19, 2002

(54) MOVABLE MAGNIFICATION ICONS FOR ELECTRONIC DEVICE DISPLAY SCREENS

(75) Inventor: Mona Singh, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/309,838

(22) Filed: May 11, 1999

(51) Int. Cl.[7] .................................................. G09G 5/00
(52) U.S. Cl. ........................ 345/173; 345/179; 345/184; 345/764; 345/767; 345/810; 345/815; 345/821; 345/823; 345/828; 345/829
(58) Field of Search ................................. 345/156, 173, 345/179, 184, 775, 779, 786, 798–801, 815, 821, 823, 828, 829

(56) References Cited

U.S. PATENT DOCUMENTS

| | | | |
|---|---|---|---|
| 5,375,199 A | * 12/1994 | Harrow et al. | 345/771 |
| 5,553,225 A | * 9/1996 | Perry | 345/660 |
| 5,615,384 A | * 3/1997 | Allard et al. | 395/326 |
| 5,682,489 A | 10/1997 | Harrow et al. | 395/349 |
| 5,923,861 A | * 7/1999 | Bertram et al. | 345/340 |
| 6,044,385 A | * 3/2000 | Gross et al. | 707/526 |
| 6,073,036 A | * 6/2000 | Heikkinen et al. | 455/575 |

FOREIGN PATENT DOCUMENTS

| | | | |
|---|---|---|---|
| DE | 2021021 | 12/1996 | |
| EP | 0880090 A2 | 11/1998 | ........... G06F/3/033 |
| EP | 0880091 A2 | 11/1998 | ........... G06F/3/033 |
| GB | 2137788 | 10/1984 | ........... G09G/3/36 |
| WO | WO92/16898 | 10/1992 | ........... G06F/15/20 |
| WO | WO-US06755 | 6/1994 | |

OTHER PUBLICATIONS

International Search Report dated Sep. 6, 2000; International Application No. PCT/US00/09743.

* cited by examiner

*Primary Examiner*—Richard Hjerpe
*Assistant Examiner*—Henry N. Tran
(74) *Attorney, Agent, or Firm*—Myers Bigel Sibley & Sajovec

(57) ABSTRACT

One or more movable magnification icons are configured to magnify displayed information and to facilitate user interaction with displayed information within touch-sensitive display screens for electronic devices. A magnification icon may incorporate the metaphor of an elongated magnifying bar that extends along a first dimension of a display screen. A control for moving the magnification icon within the display screen in response to user input may be provided as a slider control or other icon displayed within the display screen. Alternatively, a control for moving the magnification icon within the display screen may be provided as a mechanical input device adjacent the display screen.

22 Claims, 4 Drawing Sheets

MOVABLE MAGNIFICATION ICONS FOR ELECTRONIC DEVICE DISPLAY SCREENS

FIELD OF THE INVENTION

The present invention relates generally to electronic devices and, more particularly, to display screens for electronic devices.

BACKGROUND OF THE INVENTION

With the increased mobility of today's workforce, the demand for mobile communications capabilities has also increased. As a result, many portable or "hand-held" communications devices may perform a variety of computing and communications functions. For example, in addition to sending and receiving wireless (e.g., radiotelephone) communications, hand-held communications devices can be used for organizing information in calendars and address books, sending and retrieving e-mail, Web browsing, and data-sharing over the Internet, intranet or corporate networks.

Some hand-held communications devices may utilize small, touch-sensitive display screens, such as liquid crystal displays (LCDs), that are used as input/output devices for various functions and applications. Unfortunately, small touch-sensitive display screens can present challenges to manufacturers and users of hand-held communications devices for several reasons. First, it may be desirable for a user viewing a list of information, such as a telephone list, to view as many entries as possible at a time. For example, using a "day planner" calendar application running within a communications device, it may be desirable for a user to see as many hours of a day and with as much detail as possible. Second, it may be desirable to facilitate user interaction with a touchscreen display by making individual touchable objects, such as buttons and tabs, larger so that they can be more easily touched by a user.

Unfortunately, increasing the amount of information displayed within a small display screen may hinder the goal of making objects more touchable. In order to display more information within a small display screen, interactive objects may need to be reduced in size. Accordingly, there is a need for increasing the amount of information that can be displayed within small touch-sensitive display screens of electronic devices while also improving the "touchability" of selected objects.

SUMMARY OF THE INVENTION

In view of the above, it is an object of the present invention to facilitate increasing the amount of information displayed within small display screens of electronic devices.

It is another object of the present invention to facilitate user interaction with small touch-sensitive display screens.

These and other objects of the present invention are provided by a display screen for a hand-held computing device or other device having a small touch-sensitive display screen wherein one or more movable magnification icons are configured to magnify displayed information and to facilitate user interaction with displayed information. According to an embodiment of the present invention, a magnification icon may incorporate the metaphor of an elongated magnifying bar that extends along a first dimension of a display screen. A control for moving a magnification icon within a display screen in response to user input may be provided as a slider control or other icon displayed within the display screen. Alternatively, a control for moving a magnification icon within a display screen may be provided as a mechanical input device adjacent to the display screen.

According to another embodiment of the present invention, multiple magnification icons may be provided that are movable within a display screen in respective directions.

The present invention can be advantageous because information displayed within small display screens can be read easily without decreasing the amount of information displayed. Furthermore, touch-sensitive display screens incorporating the present invention can make interactive (i.e., touchable) objects easier for a user to interact with, especially small display screens containing a lot of information.

BRIEF DESCRIPTION OF THE DRAWINGS

The accompanying drawings, which are incorporated in and constitute a part of the specification, illustrate embodiments of the invention and, together with the description, serve to explain principles of the invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
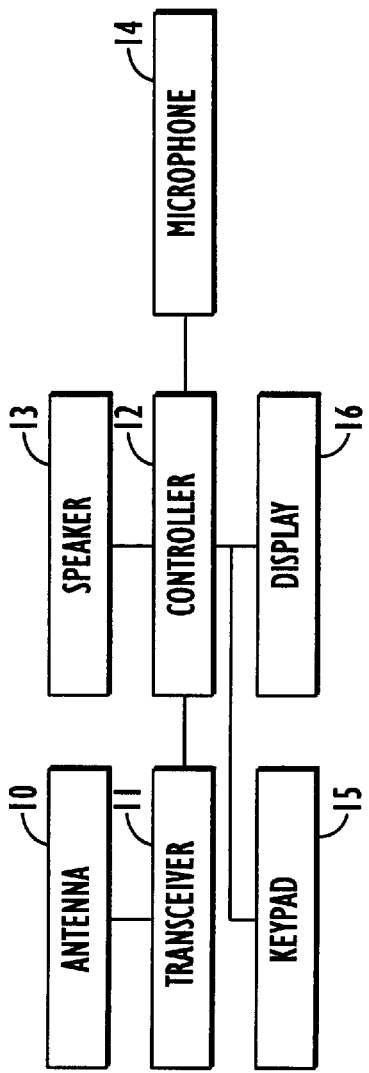
FIG. 1 is a schematic illustration of a conventional arrangement of electronic components for enabling a radiotelephone to transmit and receive telecommunications signals.

A conventional arrangement of electronic components that enable a communications device, such as a radiotelephone, to transmit and receive telecommunications signals is shown schematically in FIG. 1. An antenna 10 for receiving and transmitting wireless telecommunications signals is electrically connected to a radio-frequency transceiver 11 that is further electrically connected to a controller 12, such as a microprocessor. The controller 12 is electrically connected to a speaker 13 that transmits a remote signal from the controller 12 to a user of a radiotelephone. The controller 12 is also electrically connected to a microphone 14 that receives a voice signal from a user and transmits the voice signal through the controller 12 and transceiver 11 to a remote device. The controller 12 is electrically connected to a keypad 15 and display 16 (such as a touch-sensitive display screen) that facilitate radiotelephone operation. Radiotelephones and radiotelephone operations are known by those skilled in the art and need not be described further herein.

Figure 2:
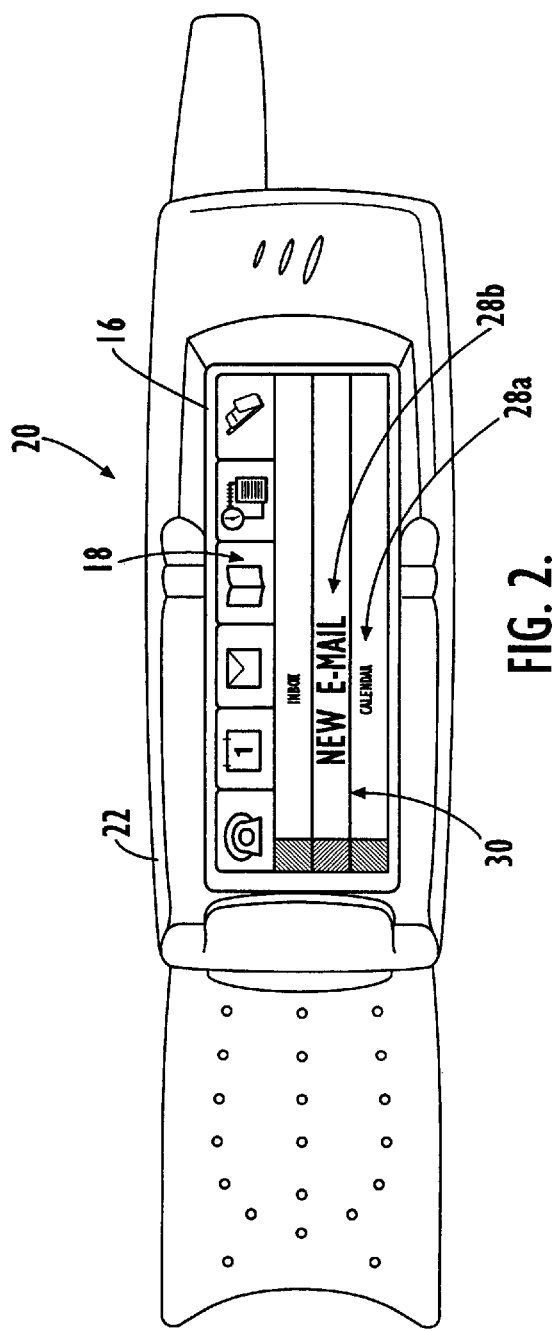
FIG. 2 is a plan view of a hand-held communications device incorporating a magnification icon within a touch-sensitive display screen according to an embodiment of the present invention.

Referring now to FIG. 2, a hand-held communications device 20 having a display screen 16 that incorporates aspects of the present invention is illustrated. The illustrated hand-held communications device 20 includes a housing 22 enclosing a radiotelephone transceiver and/or other processor (not shown) and a touch-sensitive display screen 16. A graphical user interface (GUI) 18 is displayed within the display screen 16. As is understood by those of skill in the art, a GUI is a visual interface that presents a user with various icons for interacting with a computer program and/or electronic device.

It is understood that the present invention is not limited to the illustrated hand-held communications device 20. Devices including, but not limited to, electronic devices, appliances and desktop computing devices, having various configurations and incorporating various communications capabilities may utilize display screens that incorporate aspects of the present invention.

The illustrated display screen 16 is a two-dimensional, touch-sensitive liquid crystal display (LCD) screen that is in communication with a transceiver and/or processor located within the housing 22. As would be understood by one of skill in the art, the touch-sensitive display screen 16 is configured to sense the position of a person's finger and/or stylus in contact therewith and transmit corresponding signals to the transceiver and/or processor. Touch-sensitive display screens are well known and need not be described further herein.

The illustrated touch-sensitive display screen 16 normally displays information (e.g., text and graphics) from a transceiver and/or processor in a small size 28a so that a lot of information can be displayed at a given time. A movable magnification icon 30 displayed within the display screen 16 is configured to "magnify" information from the normally displayed small size 28a to a second size 28b that is larger than the small size in order to facilitate user interaction therewith. By increasing the size of the displayed information according to the present invention, interactive (i.e., touchable) items can be easier for a user to touch within a small display screen and, particularly where there is a lot of displayed information.

Magnification icons according to the present invention can be GUI controls implemented by a GUI displayed within a display screen. As is known to those of skill in the art, a GUI control is an element that can display information within a GUI or that provides a specific way for a user to interact with an operating system and/or with an application program via a GUI. GUI controls may include iconic text buttons, pull-down menus, selection boxes, progress indicators, on-off checkmarks, scroll bars, windows, toggle buttons, forms, and many other devices for displaying information and for inviting, accepting, and responding to user actions within a GUI.

Figure 3:
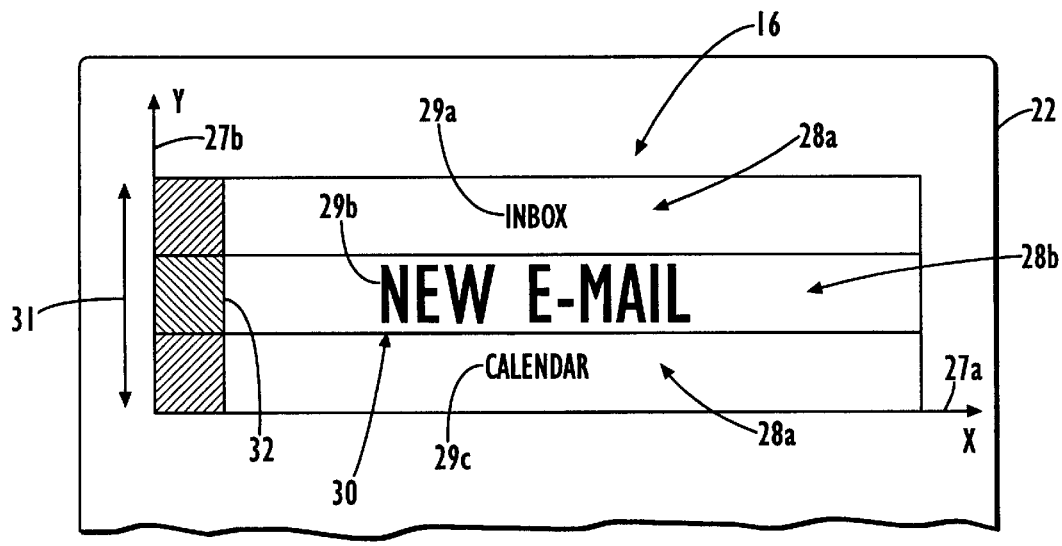
FIG. 3 is an enlarged view of the display screen incorporated within the communications device of FIG. 2.

Referring now to FIG. 3, the display screen 16 incorporated within the communications device 20 of FIG. 2 is described in more detail. The display screen 16 is two-dimensional in that it lies in a plane defined by an X-axis 27a and a Y-axis 27b, as illustrated. Three lines of text, 29a, 29b and 29c are displayed within the display screen 16 as illustrated. In order to display as much information within the display screen 16 as reasonable, text (and graphics) are normally displayed in a small size. The lines of text 29a and 29c are displayed in a normal small size 28a for the illustrated display screen 16. The line of text 29b beneath the magnification icon 30 has been "magnified" or increased to a larger size 28b as illustrated.

The magnification icon 30 is movable within the display screen 16 along a first direction, indicated by arrow 31 (i.e., along the Y-axis 27b) and is configured to magnify text (and/or graphics) positioned therebeneath. The illustrated magnification icon 30 is a metaphor of an elongated magnifying bar that extends along the X-axis 27a of the display screen 16. The magnification icon 30 magnifies the information displayed therebeneath from the normally displayed small size 28a to a larger size 28b. The magnification icon 30 may be configured to perform like a physical magnification device having a cylindrical cross-sectional shape, a plano-convex cross-sectional shape or a plano-concave cross-sectional shape.

Figure 4:
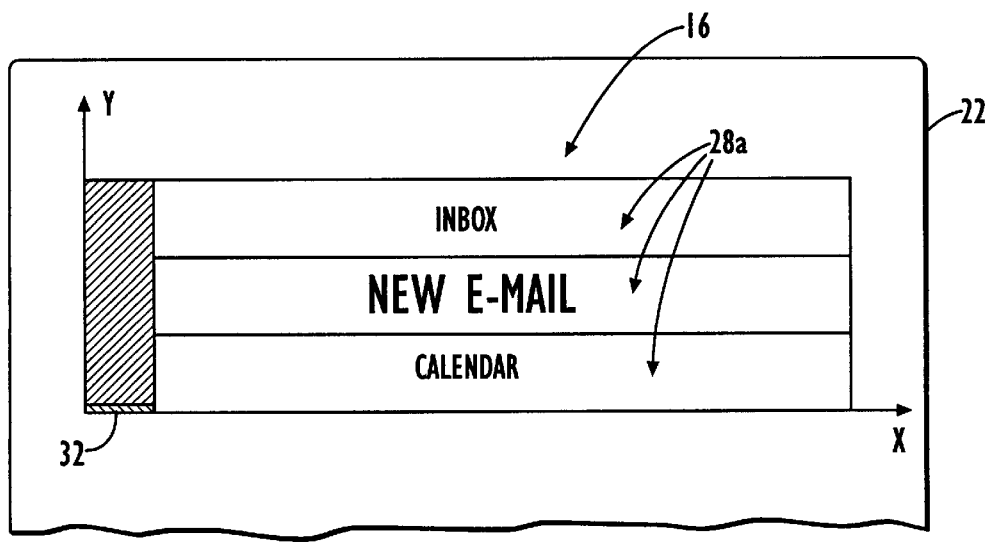
FIG. 4 illustrates the removal of the magnification icon from the display screen of FIG. 3.

A control 32 for moving the magnification icon 30 along the first direction 31 within the display screen 16 in response to user input is displayed within the display screen 16 as illustrated. The illustrated control 32 is a slider control. When not in use, the magnification icon 30 may be removed from the display screen 16 by moving the slider control 32 to the bottom (or top) of the display screen 16 as illustrated in FIG. 4.

Figure 5:
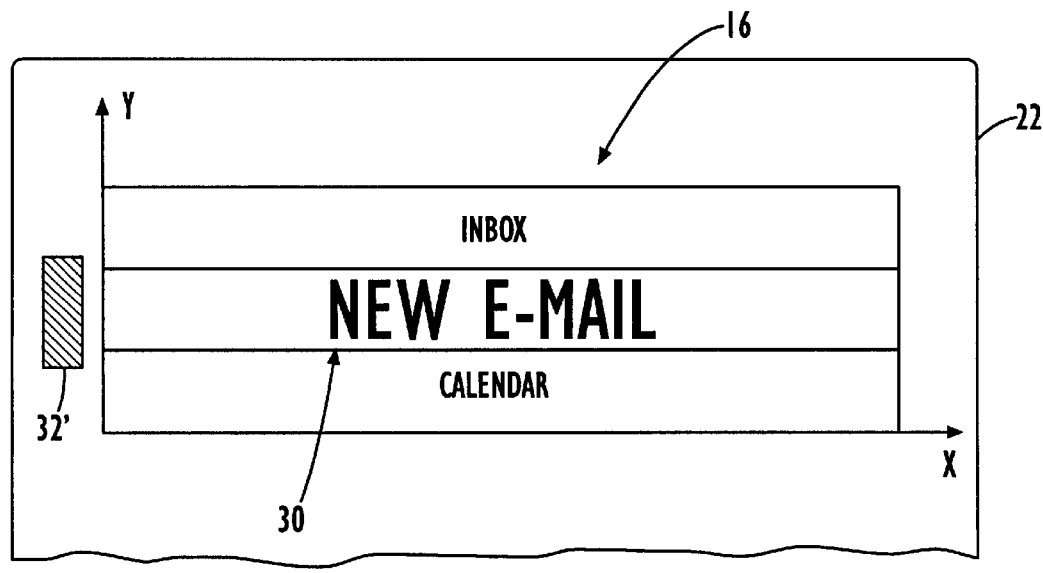
FIG. 5 schematically illustrates a wheel or other mechanical device positioned adjacent the display screen of FIG. 3 for moving the magnification icon in response to user input.

It is understood that other controls, including icon controls, that are displayed within the display screen 16, and mechanical controls that are positioned adjacent the display screen 16, may be utilized in accordance with the present invention. For example, FIG. 5 schematically illustrates a mechanical device 32' (e.g., a wheel) positioned adjacent the display screen 16 for moving the magnification icon 30 within the display screen 16 in response to user input.

Figure 6:
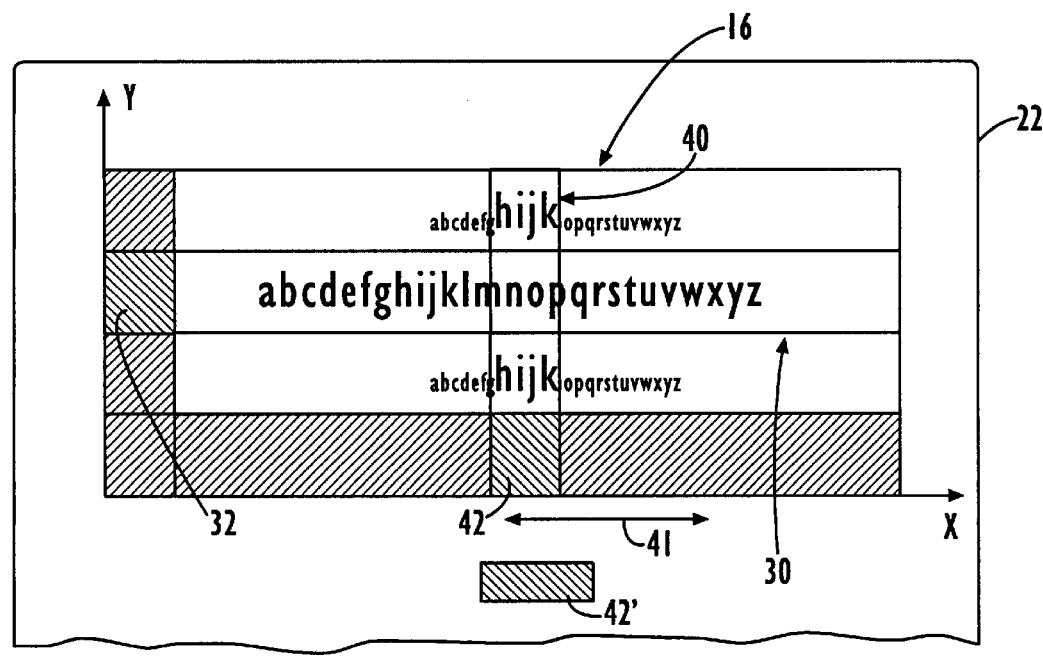
FIG. 6 illustrates a second movable magnification icon within a display screen wherein the second magnification icon is movable in a direction that is transverse to the direction of the first magnification icon.

According to another embodiment of the present invention illustrated in FIG. 6, a second movable magnification icon 40 may be utilized. The illustrated second magnification icon 40 is movable in a second direction, indicated by arrow 41 (i.e., along the X-axis 27a), that is transverse to the first direction of movement 31 of the first magnification icon 30. Similar to the first magnification icon 30, the second magnification icon 40 is a metaphor of an elongated magnifying bar that extends along the Y-axis 27b of the display screen 26. The second magnification icon 40 magnifies the information displayed therebeneath from the normally displayed small size 28a to a larger size 28b. Similar to the first magnification icon 30, the second magnification icon 40 is preferably configured to perform like a physical magnification device having a cylindrical cross-sectional shape, a plano-convex cross-sectional shape or a plano-concave cross-sectional shape.

A second control 42 for moving the second magnification icon 40 along the second direction 41 within the display screen 16 in response to user input is displayed within the display screen 16 as illustrated. The illustrated second control 42 is a slider control. As described above, when not in use, the second magnification icon 40 may be removed from the display screen 16. In addition, a mechanical control 42' positioned adjacent the display screen 16 may be utilized for moving the second magnification icon 40 within the display screen 16 in response to user input.

The magnification icons 30 and 40 described above may have various configurations and are not limited to the illustrated configuration. For example, the magnification icons 30 and 40 may extend only partially along a respective dimension of a display screen. Information displayed adjacent a magnification icon 30, 40 may also be magnified in accordance with the present invention. Also, the magnification icons 30 and 40 may be configured to perform like various magnification devices having various cross-sectional shapes and configurations. Furthermore, the extent to which information displayed within a display screen is magnified via magnification icons according to the present invention may be user adjustable.

Figure 7:
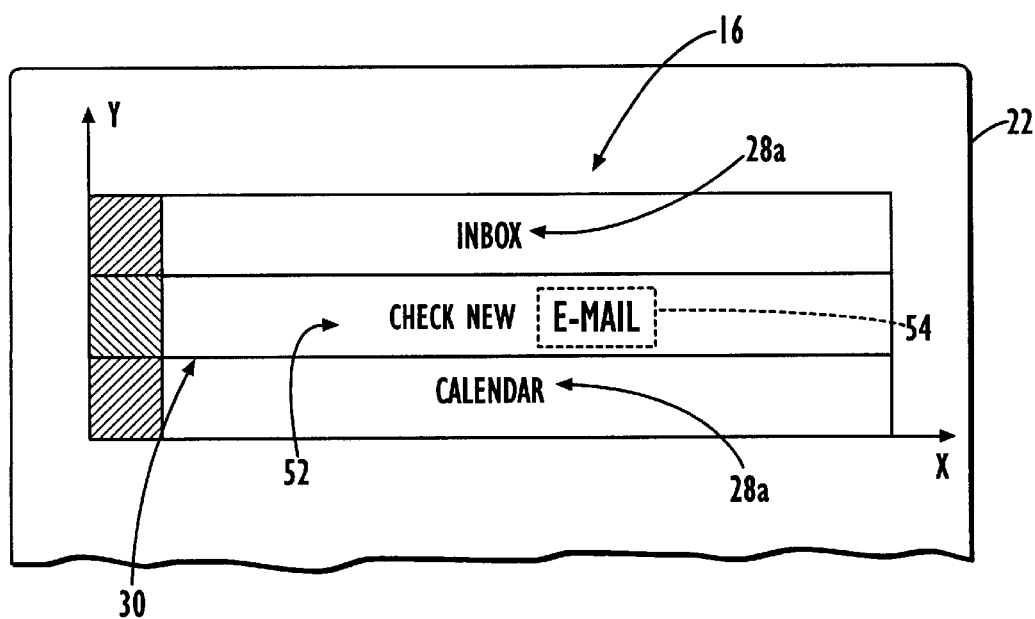
FIG. 7 illustrates a magnification icon according to another embodiment of the present invention wherein only touchable items displayed within a display screen are magnified by the magnification icon.

According to another embodiment illustrated in FIG. 7, a magnification icon 30 according to the present invention may be configured to magnify only interactive or touchable objects that are displayed within a touch-sensitive display screen. In the illustrated display screen 16 a magnification icon 30 is positioned over a line of text 52 and only a touchable item 54 is magnified.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An electronic device, comprising:
    a housing that encloses a processor;
    a two-dimensional display screen located on the housing, wherein the display screen is in communication with the processor, and wherein the display screen is configured to display interactive and non-interactive information in a first size;
    a first icon displayed within the display screen, wherein the first icon is movable in a first direction within the display screen, and wherein the first icon magnifies only interactive information displayed adjacent the first icon from the first size to a second size larger than the first size; and
    a first control for moving the first icon in the first direction within the display screen in response to user input.

2. An electronic device according to claim 1 wherein the first icon comprises a metaphor of an elongated magnifying bar that extends along a first dimension of the display screen transverse to the first direction.

3. An electronic device according to claim 1 wherein the first control is a slider control displayed within the display screen along the first direction.

4. An electronic device according to claim 1 wherein the first control is located on the housing adjacent the display screen.

5. An electronic device according to claim 1 wherein the display screen is a Liquid Crystal Display (LCD) screen.

6. An electronic device according to claim 1 wherein the display screen comprises a touch-sensitive panel that is configured to sense the position of an object in contact therewith and to transmit a corresponding signal to the processor.

7. An electronic device according to claim 6 wherein the touch-sensitive panel is configured to sense the position of an object in contact with magnified interactive information displayed adjacent the icon.

8. An electronic device according to claim 1 further comprising:
    a second icon displayed within the display screen, wherein the second icon is movable in a second direction within the display screen transverse to the first direction, and wherein the second icon comprises a metaphor of an elongated magnifying bar that extends along a second dimension of the display screen that is transverse to the second direction and magnifies only interactive information displayed adjacent the second icon from the first size to a second size that is larger than the first size; and
    a second control for moving the second icon in the second direction within the display screen in response to user input.

9. An electronic device according to claim 8 wherein the second control is a slider control displayed within the display screen along the second direction of the LCD screen.

10. An electronic device according to claim 8 wherein the second control is located on the housing adjacent the display screen.

11. A hand-held communications device, comprising:
    a housing configured to enclose a transceiver that transmits and receives wireless communications signals;
    a two-dimensional touch-sensitive liquid crystal display (LCD) screen located on the housing, wherein the LCD screen is in communication with the transceiver and displays interactive and non-interactive information therefrom in a first size, wherein the LCD screen is configured to sense the position of an object in contact therewith and to transmit a corresponding signal to the transceiver;
    a first icon displayed within the LCD screen, wherein the icon is movable in a first direction within the LCD screen, and wherein the first icon comprises a metaphor of an elongated magnifying bar that extends along a first dimension of the LCD screen and magnifies only interactive information displayed adjacent the icon from the first size to a second size larger than the first size; and
    a first control for moving the icon in the first direction within the LCD screen in response to user input.

12. A hand-held communications device according to claim 11 wherein the first control is a slider control displayed within the LCD screen along the first direction.

13. A hand-held communications device according to claim 11 wherein the first control is located on the housing adjacent the LCD screen.

14. A hand-held communications device according to claim 11 further comprising:
    a second icon displayed within the LCD screen, wherein the icon is movable in a second direction within the LCD screen transverse to the first direction, and wherein the second icon comprises a metaphor of an elongated magnifying bar that extends along a second dimension of the LCD screen and wherein the second icon magnifies only interactive information displayed adjacent the second icon from the first size to a second size that is larger than the first size; and a second control for moving the second icon in the second direction within the LCD screen in response to user input.

15. A hand-held communications device according to claim 14 wherein the second control is a slider control displayed within the LCD screen along the second direction.

16. A hand-held communications device according to claim 14 wherein the second control is located on the housing adjacent the LCD screen.

17. A two-dimensional display screen for an electronic device, wherein the display screen displays interactive and non-interactive information in a first size, comprising:
   a first icon displayed within the display screen, wherein the first icon is movable in a first direction within the display screen, and wherein the first icon comprises a metaphor of an elongated magnifying bar that extends along a first dimension of the display screen and magnifies only interactive information displayed adjacent the first icon from the first size to a second size larger than the first size;
   a first control displayed within the display screen along the first direction, wherein the first control moves the first icon in the first direction within the display screen in response to user input;
   a second icon displayed within the display screen, wherein the second icon is movable in a second direction within the display screen transverse to the first direction, and wherein the second icon comprises a metaphor of an elongated magnifying bar that extends along a second dimension of the display screen and magnifies only interactive information displayed adjacent the second icon from the first size to a second size that is larger than the first size; and
   a second control displayed within the display screen along the second direction, wherein the second control moves the second icon in the second direction within the display screen in response to user input.

18. A two-dimensional display screen according to claim 17 wherein the first control is a slider control.

19. A two-dimensional display screen according to claim 17 wherein the display screen is a Liquid Crystal Display (LCD) screen.

20. A two-dimensional display screen according to claim 17 wherein the display screen comprises a touch-sensitive panel that is configured to sense the position of an object in contact therewith.

21. A two-dimensional display screen according to claim 20 wherein the touch-sensitive panel is configured to sense the position of an object in contact with magnified information displayed adjacent the first icon.

22. A two-dimensional display screen according to claim 17 wherein the second control is a slider control.

* * * * *